United States Patent [19]

Yamashita et al.

[11] Patent Number: 5,517,437
[45] Date of Patent: May 14, 1996

[54] ALPHA BLENDING CALCULATOR

[75] Inventors: Tomoo Yamashita, Moriguchi; Yorihiko Wakayama, Katano; Akio Nishimura, Sakai; Teiji Nishizawa, Ikoma, all of Japan

[73] Assignee: Matsushita Electric Industrial Co., Ltd., Osaka, Japan

[21] Appl. No.: 263,814

[22] Filed: Jun. 22, 1994

[30] Foreign Application Priority Data

Jun. 22, 1993 [JP] Japan .................. 5-150055

[51] Int. Cl.$^6$ ........................... G06F 7/38
[52] U.S. Cl. ............................. 364/736
[58] Field of Search ................... 364/736, 768

[56] References Cited

U.S. PATENT DOCUMENTS

| 4,594,678 | 6/1986 | Uhlenhoff | 364/736 |
| 4,852,037 | 7/1989 | Aoki | 364/736 |
| 5,113,363 | 5/1992 | Orsino et al. | 364/736 |
| 5,285,403 | 2/1994 | Quisquater et al. | 364/736 |

FOREIGN PATENT DOCUMENTS

| 6-83852 | 3/1994 | Japan . |
| 91/18355 | 11/1991 | WIPO . |

OTHER PUBLICATIONS

M. Mehta et al., "High-Speed Multiplier Design Using Multi-Input Counter and Compressor Circuits", *Proceedings of the 10th IEEE Symposium on Computer Arithmetic*, pp. 43–50, (Jun. 26–28, 1991).

K. Lowe et al., "High-Speed GaAsa 4×4-Bit Parallel Multiplier Using Super Capacitor FET Logic", *Electronics Letters*, pp. 425–426, vol. 23, No. 8 (Apr. 1987).

R. White, et al., "Digital Filter Realizations Using a Special-Purpose Stored-Program Computer", *IEEE Transactions on Audio and Electroacoustics*, pp. 289–294 vol. AU-20, No. 4, (Oct. 1972).

*Primary Examiner*—Tan V. Mai
*Attorney, Agent, or Firm*—Ratner & Prestia

[57] ABSTRACT

The alpha blending calculator of the invention executes an alpha blending calculation in accordance with digital data X, Y, and α. The alpha blending calculator includes multiplexers which select one of X or Y in accordance with bits of the digital data α, respectively, and a calculating section for shifting outputs of the multiplexers by a predetermined number of bits, respectively, and for calculating a sum of the shifted outputs. The calculating section includes first level to Nth level adding portions, and an adder connected to the outputs of the Nth level adding portion for executing a multi-bit addition. Each of the first level to the Nth level adding portions receives a plurality of stages of data, classifies the plurality of stages of data into quotient groups and a remainder group, calculates a sum and a carry for each of the quotient groups, and outputs the sum, the carry, and the stages of data in the remainder group to the next level adding portion. The outputs of the multiplexers are input as the plurality of stages of data to the first level adding portion, and the outputs of the Nth level adding portion consist of a sum and a carry.

5 Claims, 8 Drawing Sheets

FIG.1

Step 1

Step 2

Step 3

Alpha blending output

Alpha blending output

ALPHA BLENDING CALCULATOR

BACKGROUND OF THE INVENTION

1. Field of the Invention

The present invention relates to an alpha blending calculator which executes an alpha blending calculation $\alpha X+(1-\alpha)Y$ in accordance with given digital data X, Y, and $\alpha$.

2. Description of the Related Art

In recent years, as digital techniques progress, images are more frequently processed in the form of digital data. In various apparatuses handling such digital images, a process called "alpha blending" is often used. The various apparatuses include, for example, an apparatus for applying special effects to images, an apparatus for processing images, and an apparatus for producing images. In the alpha blending process, two images are blended at a predetermined ratio. The alpha blending is accomplished by executing an operation of Expression (1) below for every pixel included in two images. Hereinafter, the operation shown in Expression (1) is referred to as "an alpha blending calculation".

$$P = \alpha X + (1-\alpha)Y \tag{1}$$

where X denotes a digital value of a pixel included in one image, Y denotes a digital value of a pixel included in another image, and $\alpha$ denotes a predetermined blending ratio.

In order to obtain a single blended image by blending two images, it is necessary to execute an enormous number of alpha blending calculations. This means that it is necessary to execute each alpha blending calculation at a high speed.

Japanese Laid-Open Patent Publication No. 6-83852 discloses a conventional alpha blending calculator. Hereinafter, the conventional alpha blending calculator will be described with reference to FIGS. 7 and 8.

Figure 7:
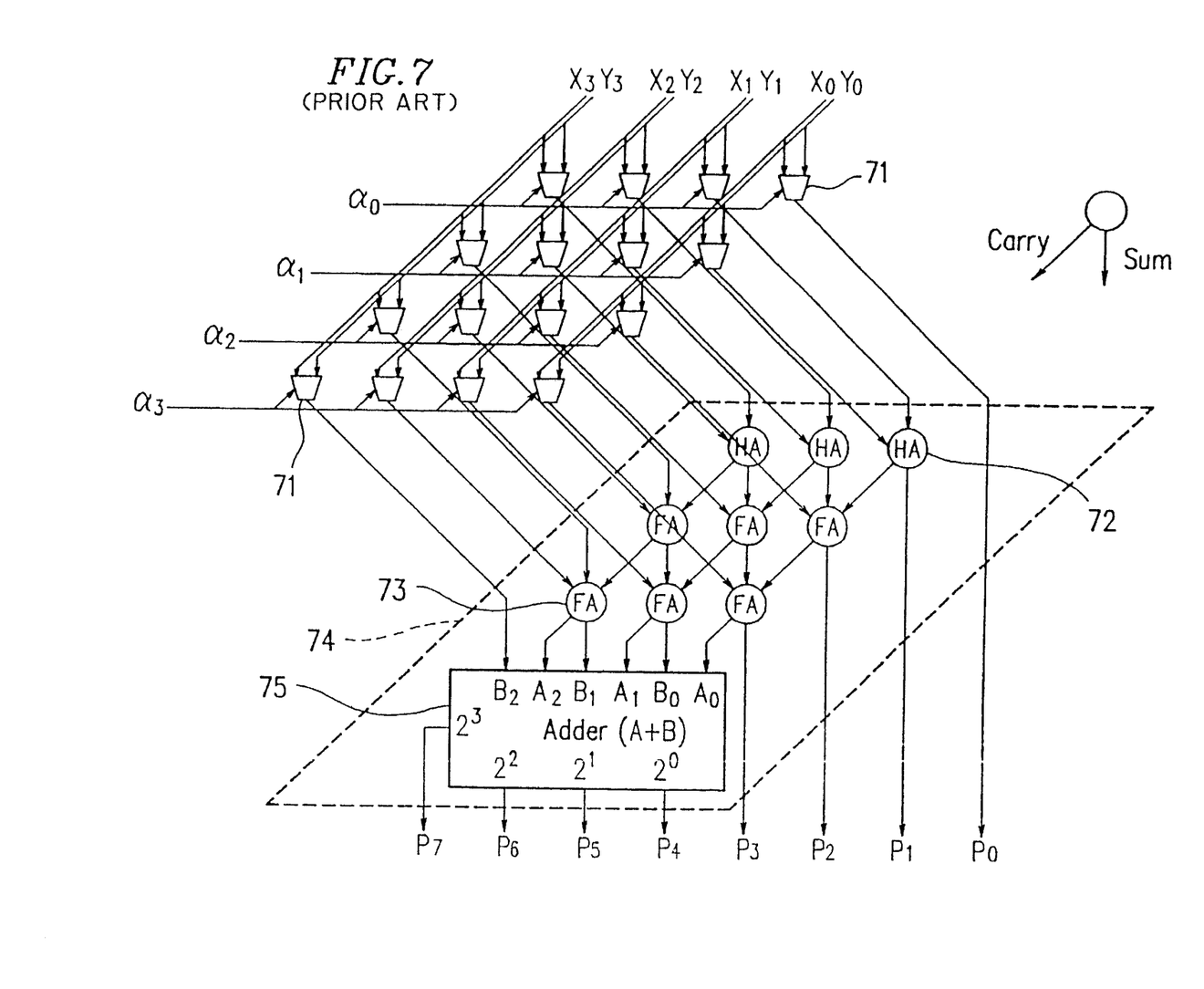
FIG. 7 shows the organization of a conventional alpha blending calculator.

FIG. 7 shows the organization of an alpha blending calculator which executes an alpha blending calculation $\alpha X+(1-\alpha)Y$ in accordance with given digital data X, Y, and $\alpha$. Each of the digital data X, Y, and $\alpha$ is 4-bit binary data. In FIG. 7, $X_0$ through $X_3$ represent the least significant bit (LSB) to the most significant bit (MSB) of the digital data X, respectively. Also, $Y_0$ through $Y_3$ represent the least significant bit (LSB) to the most significant bit (MSB) of the digital data Y, respectively. The digital data $\alpha$ is a fixed-point number with the binary point to the left of the most significant bit (MSB). The least significant bit (LSB) to the most significant bit (MSB) of the digital data $\alpha$ are represented by $\alpha_0$ through $\alpha_3$, respectively. The reference symbols $P_0$ through $P_7$ represent the least significant bit (LSB) to the most significant bit (MSB) of an 8-bit fixed-point number P indicative of the result of the alpha blending calculation $\alpha X+(1-\alpha)Y$. The binary point is located between $P_3$ and $P_4$.

The alpha blending calculator includes multiplexers 71 arranged in 4 rows and 4 columns, and an adding section 74 for adding the outputs from the multiplexers 71. The adding section 74 includes half adders 72, full adders 73, and an adder 75 which executes multi-bit addition.

Each of the multiplexers 71 has two data lines for receiving two data inputs and one selection line for receiving selection data. The multiplexer 71 outputs one of two data inputs in accordance with the selection data. Respective bits of the digital data X and Y are input through the data lines of the multiplexers 71, and respective bits of the digital data $\alpha$ are input through the selection lines of the multiplexers 71.

The outputs of the multiplexers 71 are connected to the half adders 72 and the full adders 73. The half adders 72 and the full adders 73 are arranged in accordance with the organization of array multiplier.

As described above, in the case where the digital data $\alpha$ is composed of 4 bits, Expression (1) can be transformed into Expression (2) below.

$$P = \alpha X + \bar{\alpha} Y + Y 2^{-4} \tag{2}$$

When Expression (2) is expanded while the third term of the right side is omitted, Expression (3) below can be obtained.

$$\begin{aligned}
P &= \alpha X + \bar{\alpha} Y \\
&= \left(\sum_{i=0}^{3} \alpha_i 2^{i-4}\right)\left(\sum_{j=0}^{3} x_j 2^j\right) + \left(\sum_{i=0}^{3} \bar{\alpha_i} 2^{i-4}\right)\left(\sum_{j=0}^{3} y_j 2^j\right) \\
&= \sum_{i=0}^{3}\sum_{j=0}^{3} (\alpha_i x_j) 2^{i+j-4} + \sum_{i=0}^{3}\sum_{j=0}^{3} (\bar{\alpha_i} y_j) 2^{i+j-4} \\
&= \sum_{i=0}^{3}\sum_{j=0}^{3} (\alpha_i x_j + \bar{\alpha_i} y_j) 2^{i+j-4}
\end{aligned} \tag{3}$$

where, $$\alpha = \sum_{i=0}^{3} \alpha_i 2^{i-4}$$

$$X = \sum_{j=0}^{3} x_j 2^j$$

$$Y = \sum_{j=0}^{3} y_j 2^j$$

Therefore, Expression (3) is the approximation of Expression (2). However, if the number of bits of the digital data $\alpha$ is increased, the difference between P obtained by Expression (2) and P obtained by Expression (3) becomes small and negligible.

In the alpha blending calculator shown in FIG. 7, the outputs of the multiplexers 71 in the first row and the outputs of the multiplexers 71 in the second row are added. The results of the addition and the outputs of the multiplexers 71 in the third row are added. The results of the addition and the outputs of the multiplexers 71 in the fourth row are added. Then the results of the addition are added considering the carry. As a result, P is calculated on the basis of Expression (3).

Figure 8:
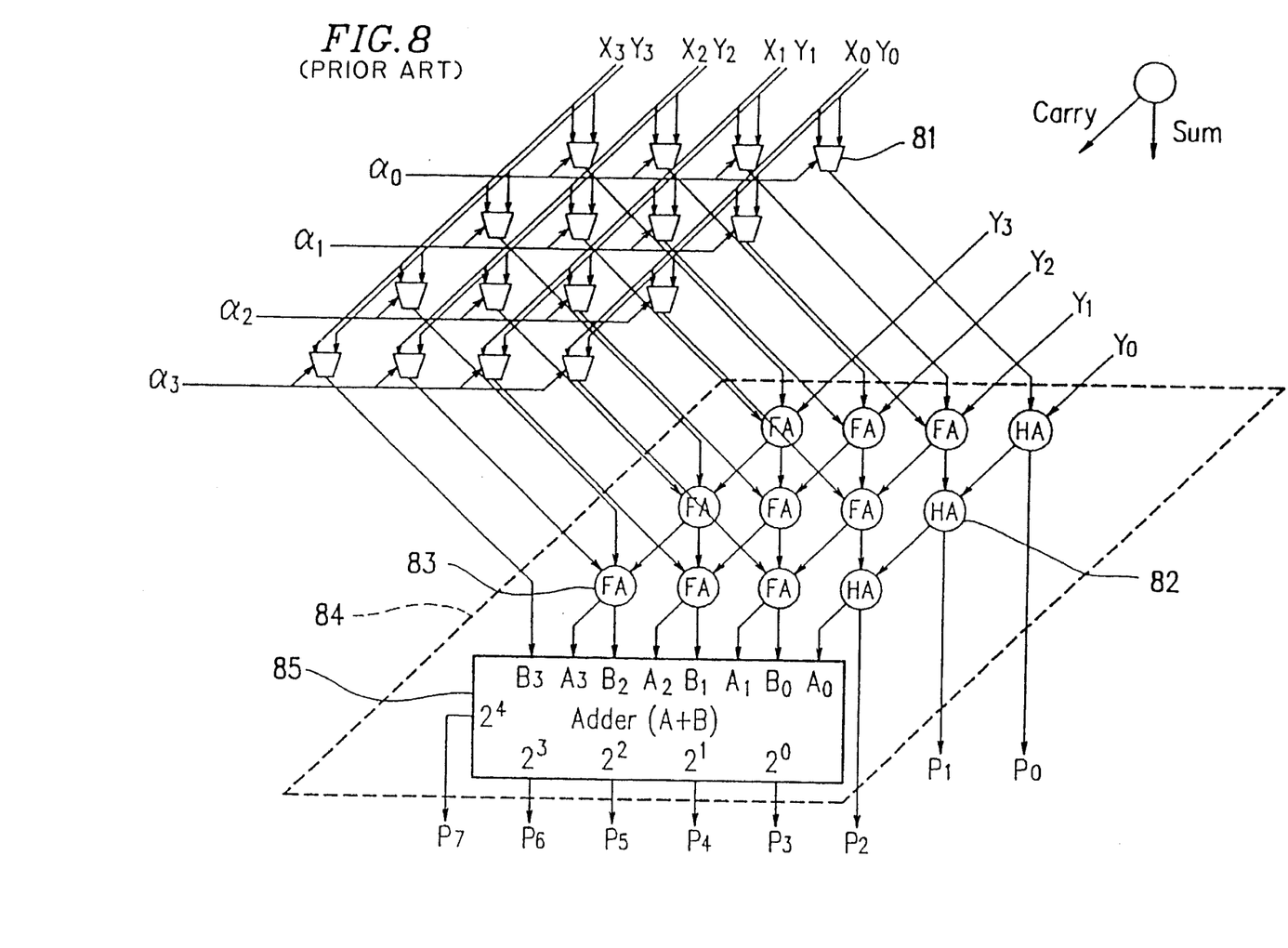
FIG. 8 shows the organization of another conventional alpha blending calculator.

FIG. 8 shows the organization of another conventional alpha blending calculator for obtaining complete P shown in Expression (2). In FIG. 8, the meanings of $X_0$–$X_3$, $Y_0$–$Y_3$, $\alpha_0$–$\alpha_3$, and $P_0$–$P_7$ are the same as those described above, and the descriptions thereof are therefore omitted. The alpha blending calculator shown in FIG. 8 includes multiplexers 81 and an adding section 84 for adding the outputs from the multiplexers 81. The adding section 84 includes half adders 82, full adders 83, and an adder 85 which executes multi-bit addition.

The organization of the alpha blending calculator shown in FIG. 8 is different from the organization of the alpha blending calculator shown in FIG. 7 in that $Y_0$–$Y_3$ are input to the adders in the first row (stage). Accordingly, the complete alpha blending calculation shown in Expression (2) can be executed.

The most easiest way for implementing an alpha blending calculator in accordance with Expression (1) is to combine one complementer, two multipliers and one adder. However, such an implementation disadvantageously results in an increase of a circuit scale of the alpha blending calculator. On the other hand, the alpha blending calculators shown in FIGS. 7 and 8 can be implemented in a circuit scale of about one multiplier.

The alpha blending calculators shown in FIGS. 7 and 8, however, utilize the organization of array multiplier to obtain the sum of the outputs of the multiplexers, so that a problem exists in that it is difficult to execute the calculation at a high speed.

SUMMARY OF THE INVENTION

The alpha blending calculator of this invention for executing an alpha blending calculation in accordance with digital data X, Y, and $\alpha$ each composed of a plurality of bits, includes: a plurality of selection means, each of the selection means selecting one of X or Y in accordance with one of the plurality of bits of the digital data $\alpha$; and calculation means for shifting outputs of the plurality of selection means by a predetermined number of bits, respectively, and for calculating a sum of the shifted outputs, wherein the calculation means includes first level to Nth level first adding means, and adding means connected to outputs of the Nth level first adding means for executing a multi-bit addition, each of the first level to the Nth level first adding means receives a plurality of stages of data, classifies the plurality of stages of data into a plurality of quotient groups each including a predetermined number of stages of data and a remainder group including data of stages the number of which is smaller than the predetermined number, calculates a sum of the predetermined number of stages of data and a carry for each of the plurality of quotient groups, and outputs the sum, the carry, and the data of stages the number of which is smaller than the predetermined number classified into the remainder group to the next level first adding means, and the outputs of the plurality of selection means are input as the plurality of stages of data to the first level first adding means, and the outputs of the Nth level first adding means consist of a sum and a carry.

In one embodiment of the invention, each of the plurality of selection means is a multiplexer.

In another embodiment of the invention, each of the first level to Nth level first adding means includes a half adder and a full adder.

In another embodiment of the invention, the digital data Y is further input as the plurality of stages of data to the first level first adding means of the calculation means.

Thus, the invention described herein makes possible the advantage of providing an alpha blending calculator of a small circuit scale which is capable of executing an alpha blending calculation at a high speed.

This and other advantages of the present invention will become apparent to those skilled in the art upon reading and understanding the following detailed description with reference to the accompanying figures.

DESCRIPTION OF THE PREFERRED EMBODIMENTS

Figure 1:
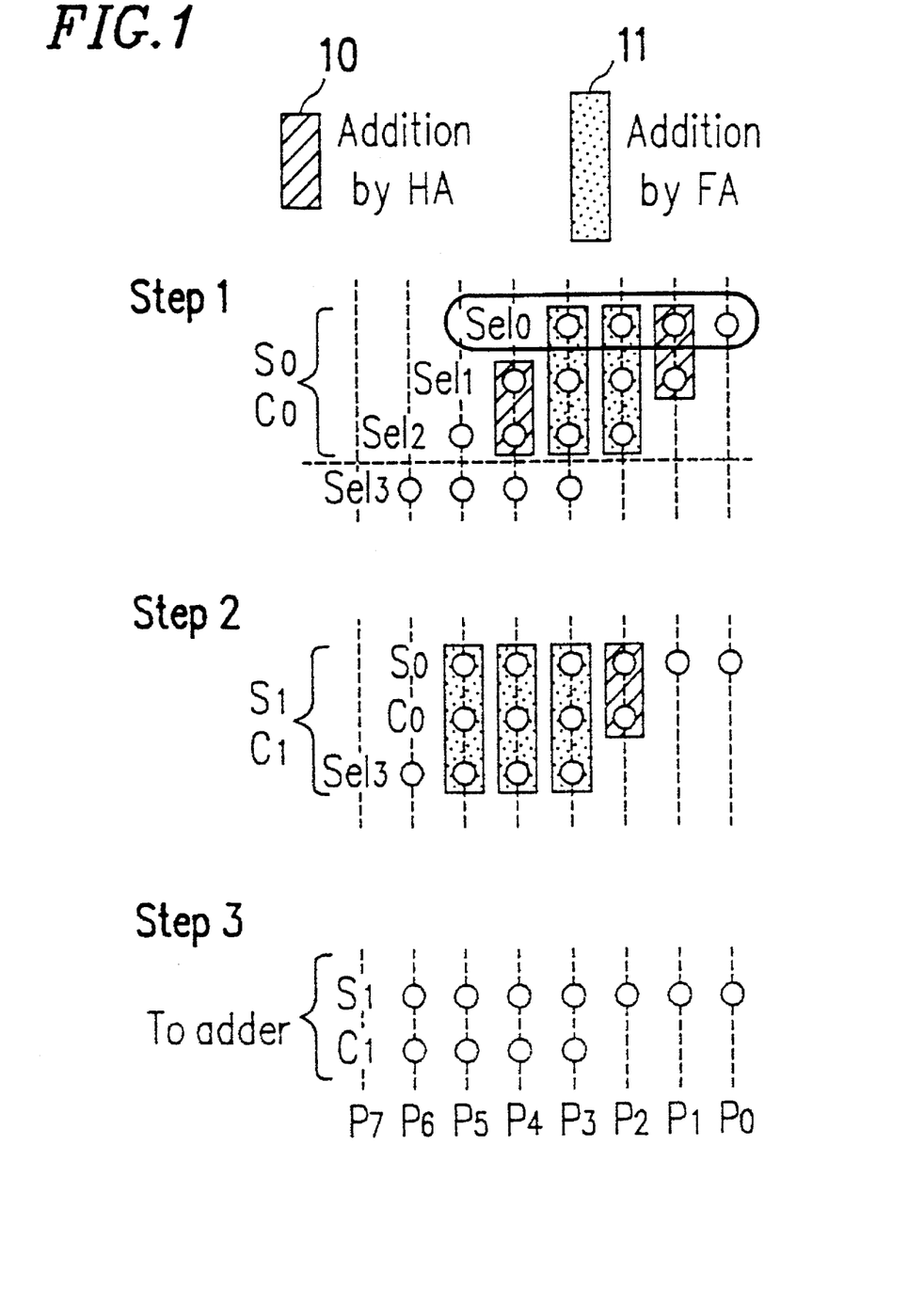
FIG. 1 shows the process of an alpha blending calculation according to the invention.

FIG. 1 shows the process of an alpha blending calculation according to the invention. In this example, each of digital data X, Y, and $\alpha$ is 4-bit binary data. In FIG. 1, $X_0$ through $X_3$ represent the least significant bit (LSB) to the most significant bit (MSB) of the digital data X, respectively. Also, $Y_0$ through $Y_3$ represent the least significant bit (LSB) to the most significant bit (MSB) of the digital data Y, respectively. The digital data $\alpha$ is a fixed-point number with the binary point to the left of the most significant bit (MSB). The least significant bit (LSB) to the most significant bit (MSB) of the digital data $\alpha$ are represented by $\alpha_0$ through $\alpha_3$, respectively. The reference symbols $P_0$ through $P_7$ represent the least significant bit (LSB) to the most significant bit (MSB) of an 8-bit fixed-point number P indicative of the result of the alpha blending calculation $\alpha X+(1-\alpha)Y$. The binary point is located between $P_3$ and $P_4$.

Hereinafter, with reference to FIG. 1, the procedure of the alpha blending calculation (step 1 to step 3) will be described.

In step 1, either one of the digital data X or Y is selected in accordance with each bit of the digital data $\alpha$. The reference symbols $Sel_0$, $Sel_1$, $Sel_2$, and $Sel_3$ indicate the bit arrangements in which the data X or Y which are selected for the respective bits ($\alpha_3$, $\alpha_2$, $\alpha_1$, $\alpha_0$) of the digital data $\alpha$ are successively shifted to the left by one bit. A circle shows a bit of the selected data X or Y. The data X is selected when the associated bit of the data $\alpha$ is "1", and the data Y is selected when the associated bit of the data $\alpha$ is "0". In the case where ($\alpha_3$, $\alpha_2$, $\alpha_1$, $\alpha_0$)= (0, 1, 1, 0), Y, X, X, and Y are selected. As a result, in the first stage to the fourth stage, ($Y_3$, $Y_2$, $Y_1$, $Y_0$), ($X_3$, $X_2$, $X_1$, $X_0$), ($X_3$, $X_2$, $X_1$, $X_0$), and ($Y_3$, $Y_2$, $Y_1$, $Y_0$) are arranged in such a manner so as to be successively shifted to the left by one bit. Next, respective digits of the $Sel_0$, $Sel_1$, and $Sel_2$ are added to each other, so as to obtain a sum $S_0$ and a carry $C_0$. For example, the addition can be accomplished by adding the digits in blocks 10 by two half adders, and by adding the digits in blocks 11 by two full adders, as shown in FIG. 1.

In step 2, respective digits of the sum $S_0$, the carry $C_0$, and the $Sel_3$ obtained in step 1 are added to each other, so as to obtain a sum $S_1$ and a carry $C_1$. For example, the addition can be accomplished by adding the digits in a block 10 by a half adder, and by adding the digits in blocks 11 by three full adders, as shown in FIG. 1.

In step 3, the sum $S_1$ and the carry $C_1$ obtained in step 2 are added considering the carry. As a result, an 8-bit fixed-point number P is obtained. The fixed-point number P is obtained in accordance with Expression (3) shown above. Accordingly, the fixed-point number P is the approximation of the alpha blending calculation $\alpha X+(1-\alpha)Y$.

Figure 2:
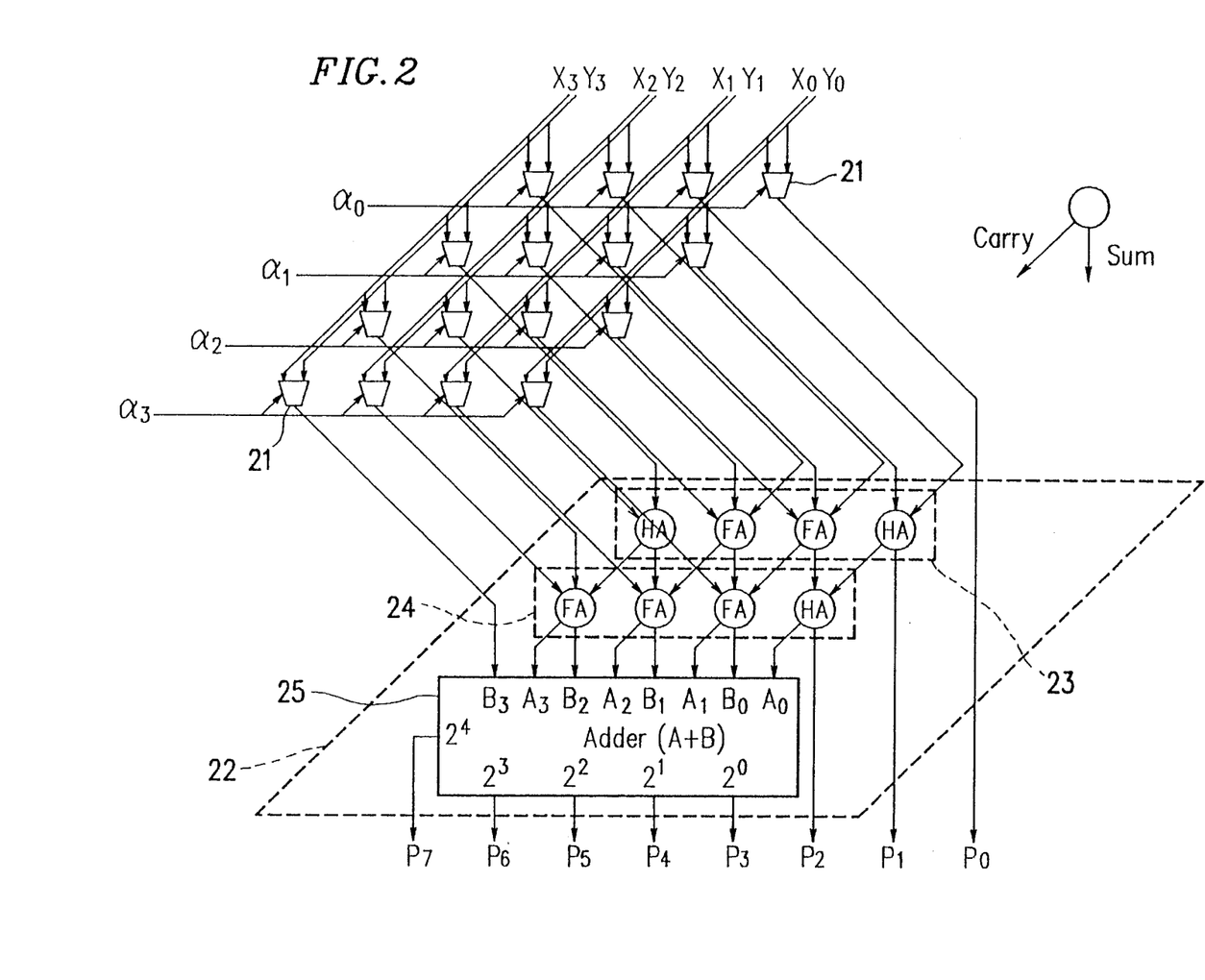
FIG. 2 is a diagram showing the organization of an alpha blending calculator in one example according to the invention.

FIG. 2 shows the organization of an alpha blending calculator in one example according to the present invention. The alpha blending calculator executes the alpha blending calculation in accordance with the procedure shown in FIG. 1. The alpha blending calculator includes multiplexers 21 arranged in four rows and four columns, and an adding section 22. Each of the multiplexers 21 selects X or Y in accordance with each bit of the digital data α. In the adding section 22, the outputs of the multiplexers 21 are shifted by a predetermined number of bits, and the sum of the shifted outputs is obtained. The adding section 22 has a first level adding portion 23, a second level adding portion 24, and an adder 25. The first level adding portion 23 is connected to the outputs of the multiplexers 21 arranged in the first to third rows, so as to execute a process corresponding to step 1 in FIG. 1. The first level adding portion 23 is implemented by two half adders (HA's) and two full adders (FA's). The second level adding portion 24 is connected to the outputs of the first level adding portion 23 and the outputs of the multiplexers 21 arranged in the fourth rows, so as to execute a process corresponding to step 2 shown in FIG. 1. The second level adding portion 24 is implemented by a single half adder (HA) and three full adders (FA's). The adder 25 is connected to the outputs of the second level adding portion 24, so as to execute a process corresponding to step 3 shown in FIG. 1.

A half adder (HA) receives two single bit numbers A and B, and outputs a sum S of A and B, and a carry C to the next digit. Each of A, B, S, and C is "0" or "1". A full adder (FA) takes into account a carry $C_{in}$ from the previous digit. The full adder receives two single bit numbers A and B, and the carry $C_{in}$, and outputs the sum S of A and B, and a carry $C_{out}$ to the next digit. Each of A, B, S, $C_{in}$, and $C_{out}$ is "0" or "1". In FIG. 2, the carry output from a half adder (HA) or a full adder (FA) is indicated by an arrow pointing to the lower left direction, and the sum output from a half adder (HA) or a full adder (FA) is indicated by an arrow pointing to the downward direction.

In the alpha blending calculator shown in FIG. 2, the number of levels of addition required before the adder 25 is 2. In the conventional alpha blending calculator having the organization of array multiplier shown in FIG. 7, the number of levels of the same addition is 3. Thus, according to the alpha blending calculator in this example, the number of levels of addition can be reduced, so that the process time can be shortened. In addition, the conventional alpha blending calculator having the organization of array multiplier shown in FIG. 7 includes three half adders and six full adders. On the other hand, the alpha blending calculator shown in FIG. 2 includes three half adders and five full adders. Thus, according to the alpha blending calculator in this example, the number of adders can be reduced, so that the circuit scale of the alpha blending calculator can be minimized.

Figure 3:
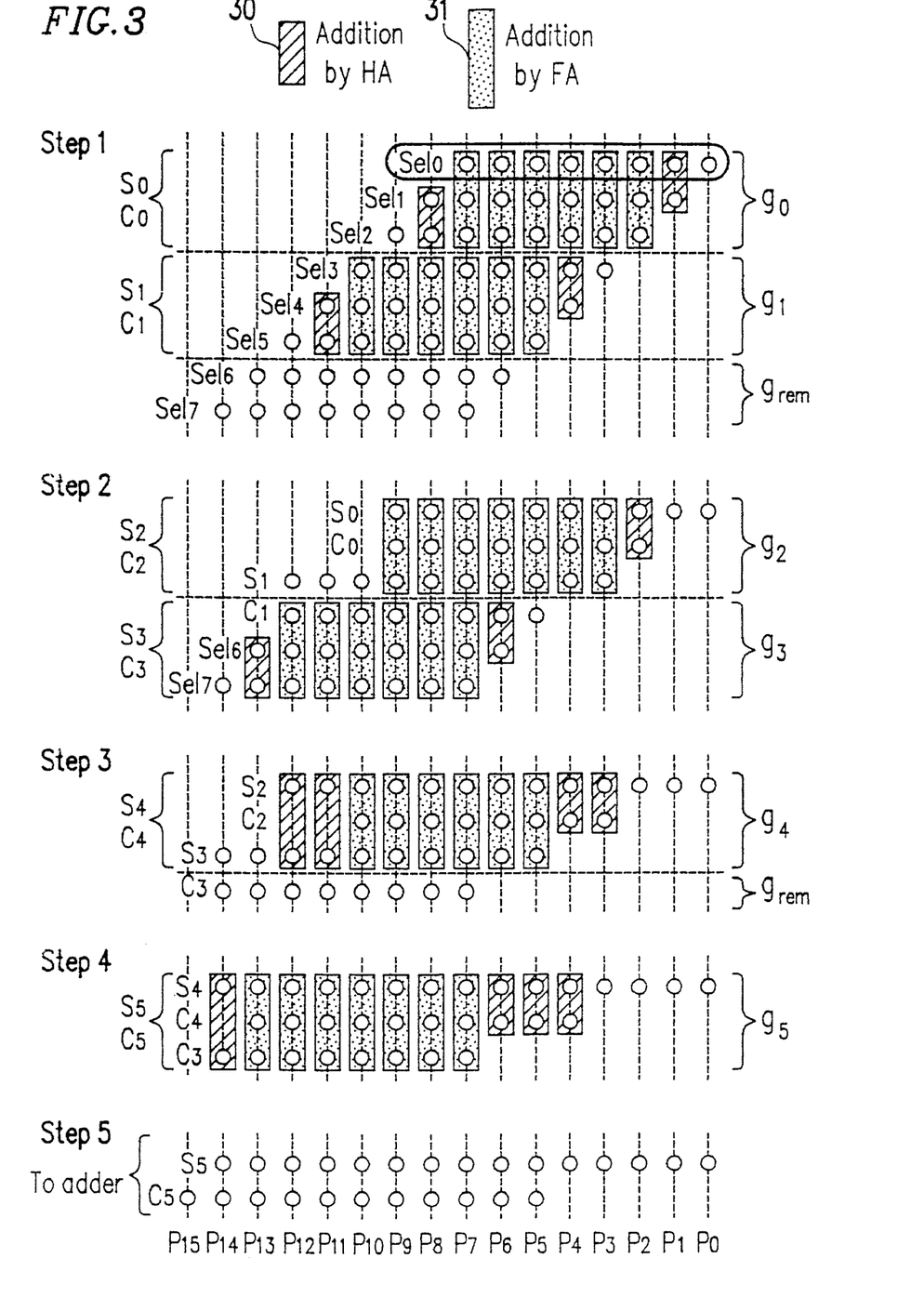
FIG. 3 shows another process of an alpha blending calculation according to the invention.

FIG. 3 shows a process of an alpha blending calculation in another example according to the invention. In this example, it is assumed that each of X, Y, and α is 8-bit binary data. In FIG. 3, $X_0$ through $X_7$ represent the least significant bit (LSB) to the most significant bit (MSB) of the digital data X, respectively. Also, $Y_0$ through $Y_7$ represent the least significant bit (LSB) to the most significant bit (MSB) of the digital data Y, respectively. The digital data α is a fixed-point number with the binary point to the left of the most significant bit (MSB). The least significant bit (LSB) to the most significant bit (MSB) of the digital data α are represented by $α_0$ through $α_7$, respectively. The reference symbols $P_0$ through $P_{15}$ represent the least significant bit (LSB) to the most significant bit (MSB) of a 16-bit fixed-point number P indicative of the result of the alpha blending calculation αX+(1−α)Y. The binary point is located between $P_7$ and $P_8$.

Hereinafter, the procedure of the alpha blending calculation (step 1 to step 5) shown in FIG. 3 will be described.

In step 1, one of the data X or Y is selected in accordance with each bit of the digital data α. The reference symbols $Sel_0$ to $Sel_7$ indicate the bit arrangements in which the data X or Y selected for the respective bits ($α_7$, $α_6$, $α_5$, $α_4$, $α_3$, $α_2$, $α_1$, $α_0$) are successively shifted to the left by one bit. A circle shows a bit of the selected data X or Y.

The eight stages of data $Sel_0$ to $Sel_7$ are grouped by regarding three stages of data as a unit. As a result, $Sel_0$ to $Sel_7$ are classified into two quotient groups $g_0$ and $g_1$, and one remainder group $g_{rem}$. The quotient group $g_0$ includes three stages of data $Sel_0$–$Sel_2$. The quotient group $g_1$ includes three stages of data $Sel_3$–$Sel_5$. The remainder group $g_{rem}$ includes two stages of data $Sel_6$ and $Sel_7$.

Respective digits of $Sel_0$ to $Sel_2$ classified into the quotient group $g_0$ are added to each other, so as to obtain a sum $S_0$ and a carry $C_0$. For example, the addition can be accomplished by adding the digits in blocks 30 by two half adders, and by adding the digits in blocks 31 by six full adders, as shown in FIG. 3. Respective digits of $Sel_3$ to $Sel_5$ classified into the quotient group $g_1$ are added to each other, so as to obtain a sum $S_1$ and a carry $C_1$. For example, the addition can be accomplished by adding the digits in blocks 30 by two half adders, and by adding the digits in blocks 31 by six full adders, as shown in FIG. 3.

In step 2, two stages of data (the sum $S_0$ and the carry $C_0$), two stages of data (the sum $S_1$ and the carry $C_1$), and the two stages of data $Sel_6$ and $Sel_7$ which are classified into the remainder group $g_{rem}$ in step 1 are grouped by regarding three stages of data as a unit. As a result, total six stages of data are classified into two quotient groups $g_2$ and $g_3$. The quotient group $g_2$ includes three stages of data $S_0$, $C_0$, and $S_1$. The quotient group $g_3$ includes three stages of data $C_1$, $Sel_6$, and $Sel_7$. When 6 is divided by 3, the remainder is 0. For this reason, there is no data which is classified into the remainder group $g_{rem}$.

Respective digits of $S_0$, $C_0$, and $S_1$ classified into the quotient group $g_2$ are added to each other, so as to obtain a sum $S_2$ and a carry $C_2$. For example, the addition can be accomplished by adding the digits in a block 30 by a half adder, and by adding the digits in blocks 31 by seven full adders, as shown in FIG. 3. Respective digits of $C_1$, $Sel_6$, and $Sel_7$ classified into the quotient group $g_3$ are added to each other, so as to obtain a sum $S_3$ and a carry $C_3$. For example, the addition can be accomplished by adding the digits in blocks 30 by two half adders, and by adding the digits in blocks 31 by six full adders, as shown in FIG. 3.

In step 3, two stages of data (the sum $S_2$ and the carry $C_2$) and two stages of data (the sum $S_3$ and the carry $C_3$) are grouped by regarding three stages of data as a unit. As a result, the total four stages of data are classified into one quotient group $g_4$ and one remainder group $g_{rem}$. The quotient group $g_4$ includes the three stages of data $S_2$, $C_2$, and $S_3$. The remainder group $g_{rem}$ include one stage of data $C_3$.

Respective digits of $S_2$, $C_2$, and $S_3$ classified into the quotient group $g_4$ are added to each other, so as to obtain a sum $S_4$ and a carry $C_4$. For example, the addition can be accomplished by adding the digits in blocks 30 by four half adders, and by adding the digits in blocks 31 by six full adders, as shown in FIG. 3.

In step 4, two stages of data (the sum $S_4$ and the carry $C_4$) and one stage of data $C_3$ classified into the remainder group $g_{rem}$ in step 3 are grouped by regarding three stages of data as a unit. As a result, the total three stages of data are classified into one quotient group $g_5$. The quotient group $g_5$ includes three stages of data $S_4$, $C_4$, and $C_3$. When 3 is divided by 3, the remainder is 0. For this reason, there is no data which is classified into the remainder group $g_{rem}$.

Respective digits of $S_4$, $C_4$, and $C_3$ classified into the quotient group $g_5$ are added to each other, so as to obtain a sum $S_5$ and a carry $C_5$. For example, the addition can be accomplished by adding the digits in blocks 30 by four half adders, and by adding the digits in blocks 31 by seven full adders, as shown in FIG. 3.

In the above-described steps 1 to 4, the classification is executed in such a manner that the data of stages which are adjacent to each other are classified into the same group. Alternatively, the classification may be executed in such a manner that the data of stages which are not adjacent to each other are classified into the same group.

In general, when the number of data stages in step n is $S_n$, the number of data stages in step (n+1) is represented by Expression (4) below.

$$S_{n+1}=(S_n/3)\times 2+(S_n\%3) \qquad (4)$$

In Expression (4), the symbol "/" indicates a calculation for obtaining a quotient, and the symbol "%" indicates a calculation for obtaining a remainder.

According to Expression (4), $S_{n+1}<S_n$. Therefore, any number of data stages in step 1 can be finally reduced to be 2 by repeatedly executing the process finite number of times.

In step 5, the sum $S_5$ and the carry $C_5$ obtained in step 4 are added considering the carry. As a result, a 16-bit fixed-point number P is obtained. The fixed-point number P is obtained in accordance with Expression (3) shown above. Accordingly, the fixed-point number P is the approximation of the alpha blending calculation $\alpha X+(1-\alpha)Y$.

Figure 4:
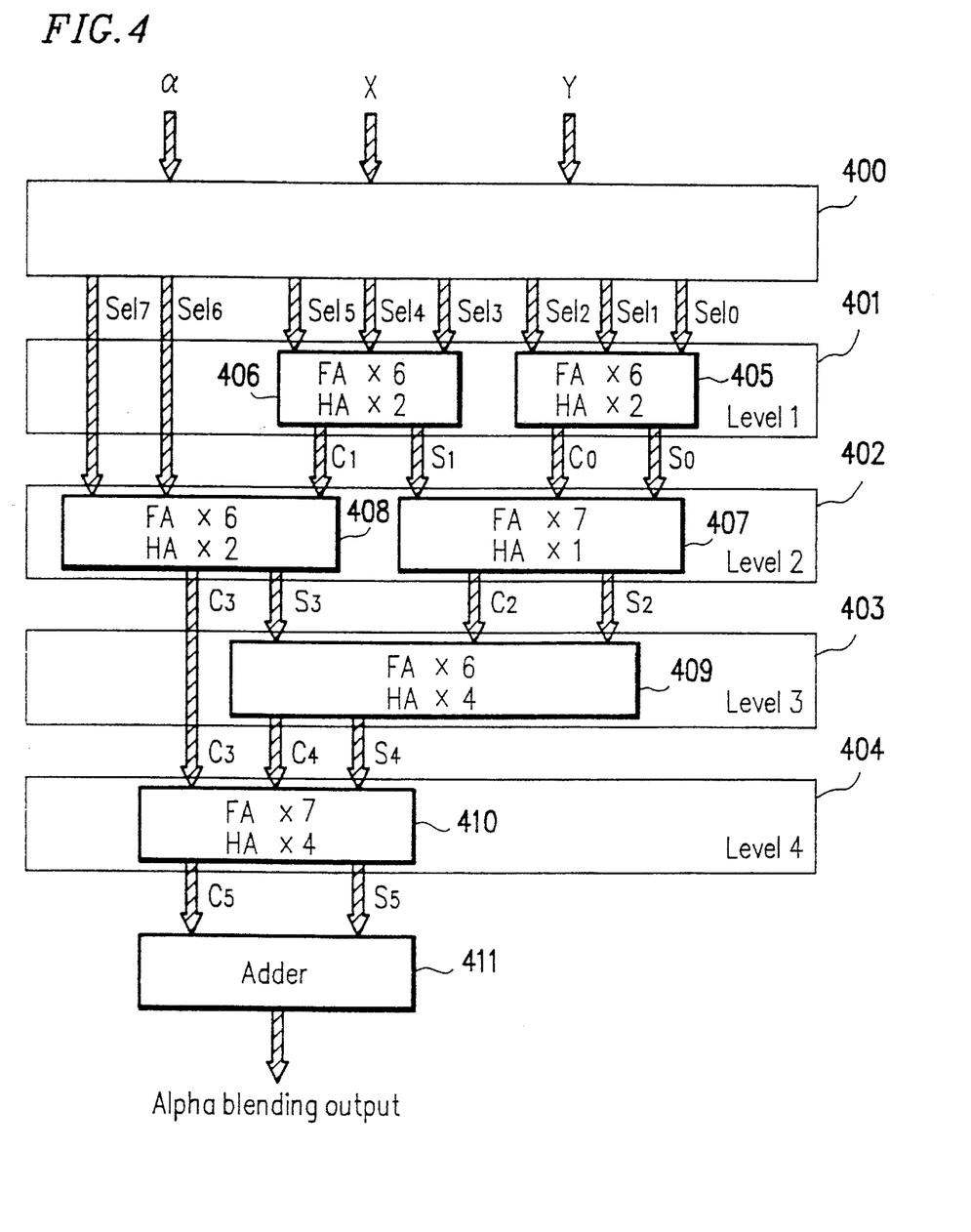
FIG. 4 is a diagram schematically showing the organization of an alpha blending calculator in another example according to the invention.

FIG. 4 schematically shows the organization of an alpha blending calculator which executes the alpha blending calculation in accordance with the procedure shown in FIG. 3. The alpha blending calculator includes a selector 400 for selecting X or Y in accordance with each bit of the digital data $\alpha$. The selector 400 outputs $Sel_0$–$Sel_7$ indicative of the selection results.

The alpha blending calculator further includes first level to fourth level adding portions 401–404, and an adder 411. The outputs $Sel_0$–$Sel_7$ of the selector 400 are input into the first level adding portion 401. The first level adding portion 401 executes a process corresponding to step 1 shown in FIG. 3. The first level adding portion 401 is implemented by adding portions 405 and 406 each having two half adders (HA's) and six full adders (FA's). The adding portion 405 executes the adding process related to the quotient group $g_0$ in step 1 of FIG. 3, and outputs the sum $S_0$ and the carry $C_0$ to the second level adding portion 402. The adding portion 406 executes the adding process related to the quotient group $g_1$ in step 1 of FIG. 3, and outputs the sum $S_1$ and the carry $C_1$ to the second level adding portion 402. The outputs $Sel_6$ and $Sel_7$ of the selector 400 are not necessarily input into the first level adding portion 401, because the outputs $Sel_6$ and $Sel_7$ are not processed in the first level adding portion 401.

The outputs of the adding portion 405 (the sum $S_0$ and the carry $C_0$), the outputs of the adding portion 406 (the sum $S_1$ and the carry $C_1$), and the outputs $Sel_6$ and $Sel_7$ of the selector 400 are input into the second level adding portion 402. The second level adding portion 402 executes a process corresponding to step 2 of FIG. 3. The second level adding portion 402 is implemented by an adding portion 407 having a half adder (HA) and seven full adders (FA's) and an adding portion 408 having two half adders (HA's) and six full adders (FA's). The adding portion 407 executes the adding process related to the quotient group $g_2$ in step 2 of FIG. 3, and outputs the sum $S_2$ and the carry $C_2$ to the third level adding portion 403. The adding portion 408 executes the adding process related to the quotient group $g_3$ in step 2 of FIG. 3, and outputs the sum $S_3$ and the carry $C_3$ to the third level adding portion 403.

The outputs of the adding portion 407 (the sum $S_2$ and the carry $C_2$) and the outputs of the adding portion 408 (the sum $S_3$ and the carry $C_3$) are input into the third level adding portion 403. The third level adding portion 403 executes a process corresponding to step 3 of FIG. 3. The third level adding portion 403 is implemented by an adding portion 409 having four half adders (HA's) and six full adders (FA's). The adding portion 409 executes the adding process related to the quotient group $g_4$ in step 3 of FIG. 3, and output the sum $S_4$ and the carry $C_4$ to the fourth level adding portion 404. The carry $C_3$ which is output from the adding portion 408 is not necessarily input into the third level adding portion 403, because the carry $C_3$ is not processed in the third level adding portion 403.

The outputs of the adding portion 409 (the sum $S_4$ and the carry $C_4$) and the carry $C_3$ output from the adding portion 408 are input into the fourth level adding portion 404. The fourth level adding portion 404 executes a process corresponding to step 4 of FIG. 3. The fourth level adding portion 404 is implemented by an adding portion 410 having four half adders (HA's) and seven full adders (FA's). The adding portion 410 executes the adding process related to the quotient group $g_5$ in step 4 of FIG. 3, and outputs the sum $S_5$ and the carry $C_5$ to the adder 411.

The adder 411 adds the sum $S_5$ and the carry $C_5$ considering the carry, and outputs the result of addition as the 16-bit fixed-point number P.

In the alpha blending calculator shown in FIG. 4, the number of levels of addition before the adder 411 is 4. In the conventional alpha blending calculator having the organization of array multiplier, the number of levels of the same addition is 7 (=8–1). Thus, according to the alpha blending calculator in this example, the number of levels of addition can be greatly reduced, so that the process time can be shortened. A conventional alpha blending calculator having the organization of array multiplier includes seven (=8–1) half adders in the first stage and forty-two (=7×(7–1)) full adders in the remaining stage. On the other hand, the alpha blending calculator shown in FIG. 4 includes 15 half adders and 38 full adders. Thus, the circuit scale of the alpha blending calculator in this example is slightly larger than that of the conventional one.

In general, the number of bits of the digital data X and Y is m, the number of levels of addition required for the conventional alpha blending calculator having the organization of array multiplier is (m−1), and hence the process time is O(m). On the other hand, the level number L of adding processes required for the alpha blending calculator according to the invention is approximately based on Expression (5) below, so that the process time is O(log m).

$$L=5.67(\log m-0.30) \qquad (5)$$

Therefore, the alpha blending calculator according to the invention can execute the calculation at a much higher speed as compared with the conventional alpha blending calculator having the organization of array multiplier. It is also found that, as the number m of bits of X and Y increases, the difference in process time is remarkably increased. If a carry lookahead adder is used as the adder 411 shown in FIG. 4, the process time can be further shortened.

Figure 5:
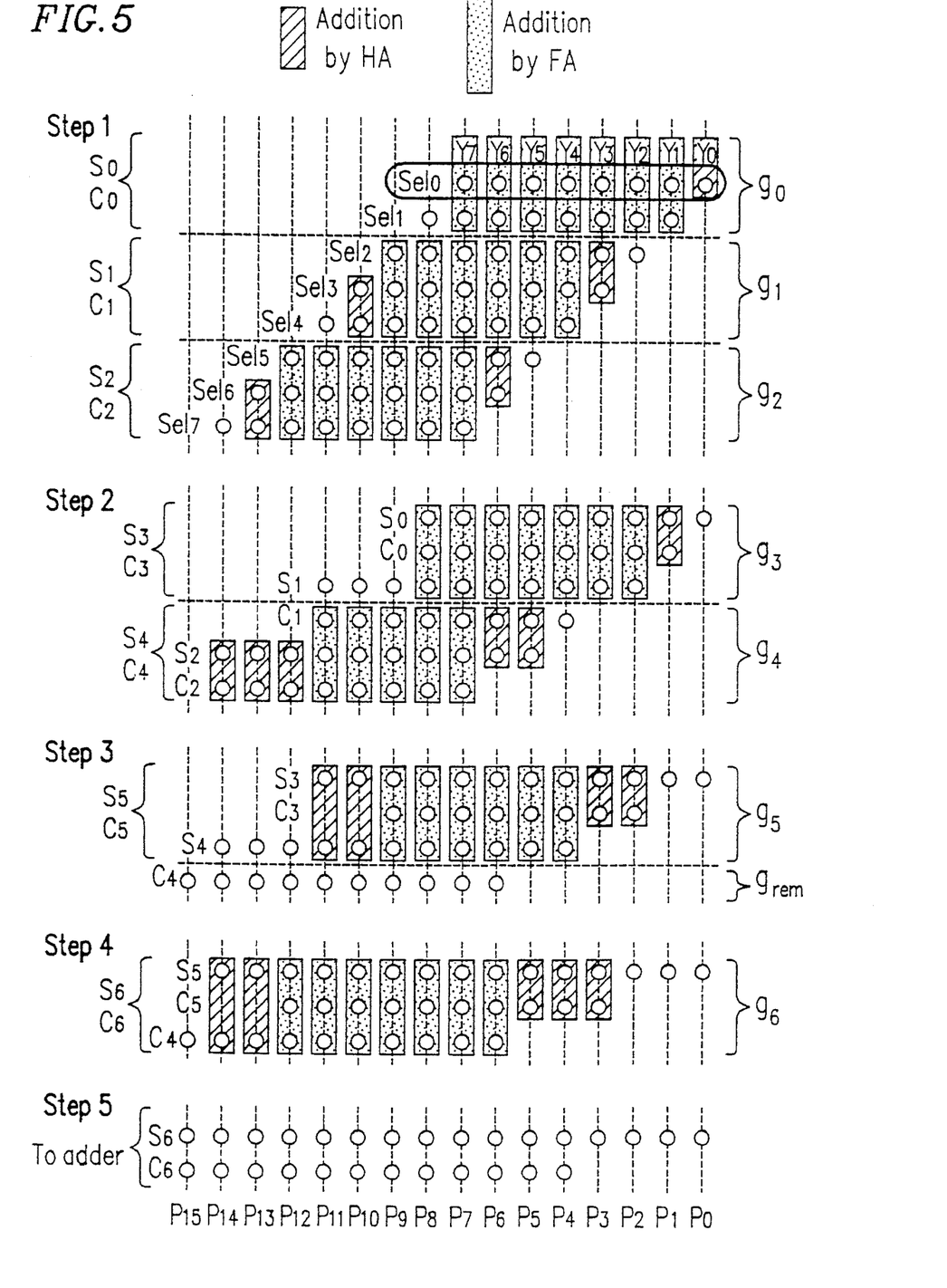
FIG. 5 shows another process of an alpha blending calculation according to the invention.

FIG. 5 shows a process of an alpha blending calculation in another example according to the invention. In this process, a complete alpha blending calculation is realized. In this example, it is assumed that each of X, Y, and α is 8-bit binary data. In FIG. 5, the meanings of $X_0$–$X_7$, $Y_0$–$Y_7$, $α_0$–$α_7$, and $P_0$–$P_{15}$ are the same as those described above, so that the descriptions thereof are omitted.

The alpha blending calculation shown in FIG. 5 is different from the alpha blending calculation shown in FIG. 3 in that ($Y_7$, $Y_6$, $Y_5$, $Y_4$, $Y_3$, $Y_2$, $Y_1$, $Y_0$) are additionally processed in the adding process in step 1. As a result, in step 1, nine stages of data are classified into three quotient groups $g_0$, $g_1$, and $g_2$ by regarding three stages of data as a unit. Thereafter, in the same way as in the alpha blending calculation shown in FIG. 3, (1) the classification into quotient groups and a remainder group, and (2) the addition for respective digits of the quotient groups are repeatedly executed in each step. Finally, in step 5, the sum $S_6$ and the carry $C_6$ are added to each other considering the carry. As a result, a 16-bit fixed-point number P is obtained. The fixed-point number P indicates the result of the complete alpha blending calculation.

Figure 6:
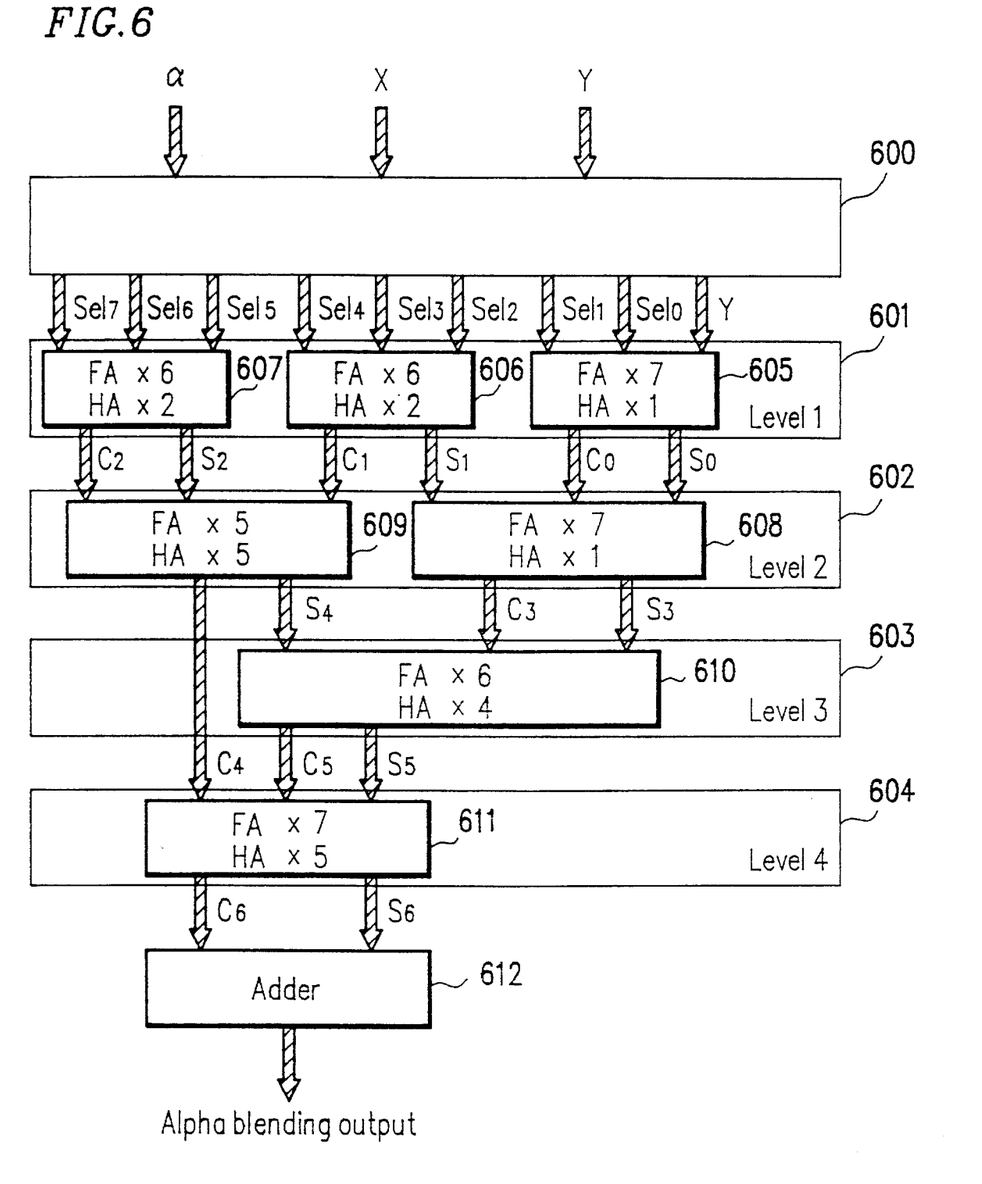
FIG. 6 is a diagram schematically showing the organization of an alpha blending calculator in another example according to the invention.

FIG. 6 schematically shows the organization of an alpha blending calculator which executes the alpha blending calculation in accordance with the procedure shown in FIG. 5. The alpha blending calculator includes a selector 600 for selecting one of the data X or Y in accordance with each bit of the digital data α. The selector 600 outputs $Sel_0$–$Sel_7$ indicative of the selection results.

The alpha blending calculator further includes first level to fourth level adding portions 601 to 604, and an adder 612. The first level to fourth level adding portions 601 to 604 execute processes corresponding to steps 1 to 4 in FIG. 5, respectively. The adder 612 adds the sum $S_6$ and the carry $C_6$ output from the fourth level adding portion 604 considering the carry, and outputs the addition result as the 16-bit fixed-point number P.

The first level adding portion 601 is implemented by an adding portion 605 having a half adder (HA) and seven full adders (FA's), an adding portion 606 having two half adders (HA's) and six full adders (FA's), and an adding portion 607 having two half adders (HA's) and six full adders (FA's).

The second level adding portion 602 is implemented by an adding portion 608 having a half adder (HA) and seven full adders (FA's) and an adding portion 609 having five half adders (HA's) and five full adders (FA's).

The third level adding portion 603 is implemented by an adding portion 610 having four half adders (HA's) and six full adders (FA's).

The fourth level adding portion 604 is implemented by an adding portion 611 having five half adders (HA's) and seven full adders (FA's).

In the alpha blending calculator shown in FIG. 6, the number of levels of addition before the adder 612 is 4. In a conventional alpha blending calculator of the organization of array multiplier, the number of levels of the same addition is 7 (=8−1). Thus, according to the alpha blending calculator in this example, the number of levels of addition can be greatly reduced, so that the process time can be shortened. The conventional alpha blending calculator of the organization of array multiplier includes 7 half adders and 49 full adders. On the other hand, the alpha blending calculator shown in FIG. 6 includes 20 half adders and 44 full adders. Thus, the circuit scale of the alpha blending calculator in this example is slightly larger than that of the conventional one.

For simplifying the description, the invention is described by way of exemplary cases where each of the digital data X, Y, and α is composed of 4 bits and where each of the digital data X, Y, and α is composed of 8 bits. It is appreciated that the number of bits is not limited to the above-mentioned specific values. As described above, as the number of bits of the digital data increases, the reduction effect in process time is remarkably increased. In the field of digital images, a technique in which full-color images are displayed by using 24-bit data is developed. The present invention is suitable for executing the alpha blending calculation for digital data composed of such a large number of bits at a high speed.

In addition, the present invention can be applied to the case where the bit width of the digital data X and Y is not equal to the bit width of the digital data α.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An alpha blending calculator for executing an alpha blending calculation in accordance with digital data X, Y, and α each composed of a plurality of bits, the alpha blending calculator comprising:

a plurality of selection means, each of the selection means selecting one of X or Y in accordance with one of the plurality of bits of the digital data α; and calculation means for shifting outputs of the plurality of selection means by a predetermined number of bits, respectively, and for calculating a sum of the shifted outputs, the calculation means comprising:
first level to Nth level first adding means; and second adding means, connected to outputs of the Nth level first adding means, for executing a multi-bit addition, wherein each of the first level to the Nth level first adding means:

(a) receives a plurality of stages of data, (b) classifies the plurality of stages of data into at least one quotient group which includes a predetermined number of stages of data and a remainder group including a number of stages of data which is smaller than the predetermined number, (c) calculates a sum of the predetermined number of stages of data and a carry for the quotient group, and (d) outputs the sum and the carry to the next level first adding means, and outputs the stages of data in the remainder group to the next level first adding means if the number of stages in the remainder group is greater than zero, wherein the outputs of the plurality of selection means are input as the plurality of stages of data to the first level first adding means, and the outputs of the Nth level first adding means consist of a sum and a carry.

2. An alpha blending calculator according to claim 1, wherein each of the plurality of selection means is a multiplexer.

3. An alpha blending calculator according to claim 1, wherein each of the first level to Nth level first adding means includes a half adder and a full adder.

4. An alpha blending calculator according to claim 1, wherein the digital data Y is further input as the plurality of stages of data to the first level first adding means of the calculation means.

5. An alpha blending calculator according to claim 1, wherein at least one of the first level to the Nth level first adding means includes a plurality of quotient groups, each including the predetermined number of stages of data.

\* \* \* \* \*